United States Patent
Dorschner et al.

[11] Patent Number: 5,963,682
[45] Date of Patent: *Oct. 5, 1999

[54] OPTICAL BEAM STEERING SYSTEM

[75] Inventors: Terry A. Dorschner, Brookline; Lawrence J. Friedman; Douglas S. Hobbs, both of Lexington, all of Mass.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/813,528

[22] Filed: Mar. 7, 1997

Related U.S. Application Data

[63] Continuation of application No. 08/247,948, May 24, 1994, abandoned.

[51] Int. Cl.⁶ .................................................. G02B 6/26
[52] U.S. Cl. ........................... 385/16; 385/17; 385/18; 385/20; 349/159
[58] Field of Search ........................... 385/8, 9, 16, 17, 385/20, 21, 22; 359/42

[56] References Cited

U.S. PATENT DOCUMENTS

| | | | |
|---|---|---|---|
| 4,201,442 | 5/1980 | McMahon et al. | 385/17 |
| 4,278,327 | 7/1981 | McMahon et al. | 385/20 |
| 4,385,799 | 5/1983 | Soref | 385/17 |
| 4,478,494 | 10/1984 | Soref | 385/8 |
| 4,720,171 | 1/1988 | Baker | 359/42 |
| 4,720,172 | 1/1988 | Baker | 359/42 |
| 4,737,019 | 4/1988 | Baker | 359/42 |
| 5,373,393 | 12/1994 | DeJule et al. | 359/42 |
| 5,440,654 | 8/1995 | Lambert, Jr. | 385/17 |

OTHER PUBLICATIONS

Damman, H. et al., "High–Efficiency In–Line Multiple Imaging By Means of Multiple Phase Holograms", Optics Communications, Jul. 1971, pp. 312–315.

Mait, J. "Design of Binary–Phase and Multiphase Fourier Gratings for Array Generation", J. Opt. Soc. Am. A, vol. 7, No. 8, Aug. 1990, pp. 1514–1528.

Paparao, P. et al., "Generation of Reconfigurable Interconnections with a Two–Dimensional Acousto–Optic Deflector", Applied Optics, vol. 33, No. 11, Apr. 10, 1994, pp. 2140–2146.

*Primary Examiner*—Hung N. Ngo
*Attorney, Agent, or Firm*—Fish & Richardson P.C.

[57] ABSTRACT

A data communication system comprising a plurality of fiber optic cables and a fiber optic switching system, comprising: a support structure for securing light emitting/light receiving ends of the plurality of fiber optic cables in predetermined positions; and, means for re-directing light emitted from the light emitting/light receiving end of one of the fiber optic cables to the light emitting/light receiving ends of one, or more than one, of a plurality of the plurality of fiber optic cables. The re-directing means includes means for collimating and directing the light emitted from the end of one of the cables as a beam propagating along a predetermined direction and for re-directing the beam towards the end of another one of the cables selectively in accordance with an electrical signal. More particularly, the re-directing means includes electro-optical phase shifting medium, preferably liquid crystal molecules.

19 Claims, 4 Drawing Sheets

OPTICAL BEAM STEERING SYSTEM

This is a continuation of application Ser. No. 08/247,948 filed May 24, 1994, now abandoned.

CROSS REFERENCE TO RELATED CASES

This patent application contains subject matter common with copending patent application Ser. No. 08/175,994, "Fiber Optic Switching System", inventor L. Q. Lambert, filed Dec. 30, 1993 and assigned to the same assignee as the present patent application, and the benefit of the filing date of the copending patent application is hereby claimed as to any subject matter claimed herein which is common to the copending patent application. Such copending patent application Ser. No. 08/175,994 is herein incorporated by reference.

BACKGROUND OF THE INVENTION

This invention relates generally to optical beam steering systems and also to data communications systems having fiber optic switching systems.

As is known in the art, fiber optics are being used in a wide variety of applications. One application is in the area of data communication systems. In such application, data, in the form of modulations of laser produced light, is transmitted to, and received from, a plurality of terminals through fiber optic cables. A switching network is provided to selectively direct the data to, and from, the terminals. Typically, the switching network converts light emitted by a transmitting one of the terminals into corresponding electrical signals. The electrical signals are directed to a selected output port of the switching network by electrical circuitry in the switching network. The electrical signals at the output port are converted into corresponding modulated light for retransmission through fiber optic cables to a receiving one of the terminals. The conversion of the modulated light to electrical signals and then back into modulated light energy, together with the electrical switching circuitry, requires the use of expensive components and/or restricts the potential bandwidth of the data communication system.

SUMMARY OF THE INVENTION

With this background of the invention in mind, it is therefore an object of this invention to provide an improved data communication switching network.

It is another object of the invention to provide an improved fiber optic switching system.

These and other objects of the invention are attained generally by providing an electro-optical beam steerer having a phase shifting medium comprising liquid crystal molecules, for splitting a light beam of light having a predetermined direction into a plurality of differently directed light beams.

In accordance with another feature of the invention a data communication system comprises: a plurality of fiber optic cables; and, a fiber optic switching system, comprising: a support structure for securing light emitting/light receiving ends of the plurality of fiber optic cables in predetermined positions; and, means for re-directing light emitted from the light emitting/light receiving end of one of the fiber optic cables to the light emitting/light receiving ends of more than one of the plurality of fiber optic cables. The re-directing means includes means for collimating and directing the light emitted from the end of one of the cables as a beam propagating along a predetermined direction and for re-directing the beam towards the end of another one of the cables selectively in accordance with an electrical control signal. More particularly, the re-directing means includes electro-optical phase shifting medium, preferably liquid crystal molecules.

With such arrangement, light emitted by any one of the cables is switched to one, or more, of the other cables without requiring intermediate conversion of the transmitted light data into electrical signals and then re-conversion of the electrical signal into light data. Thus, the information in the emitted light may be simultaneously transmitted to more that one receiver of the communication system.

BRIEF DESCRIPTION OF THE DRAWINGS

The aforementioned features and other advantages of the invention, as well as the invention itself, will be more fully understood from the following description read together with the accompanying drawings, in which.

DESCRIPTION OF THE PREFERRED EMBODIMENTS

Figure 1:
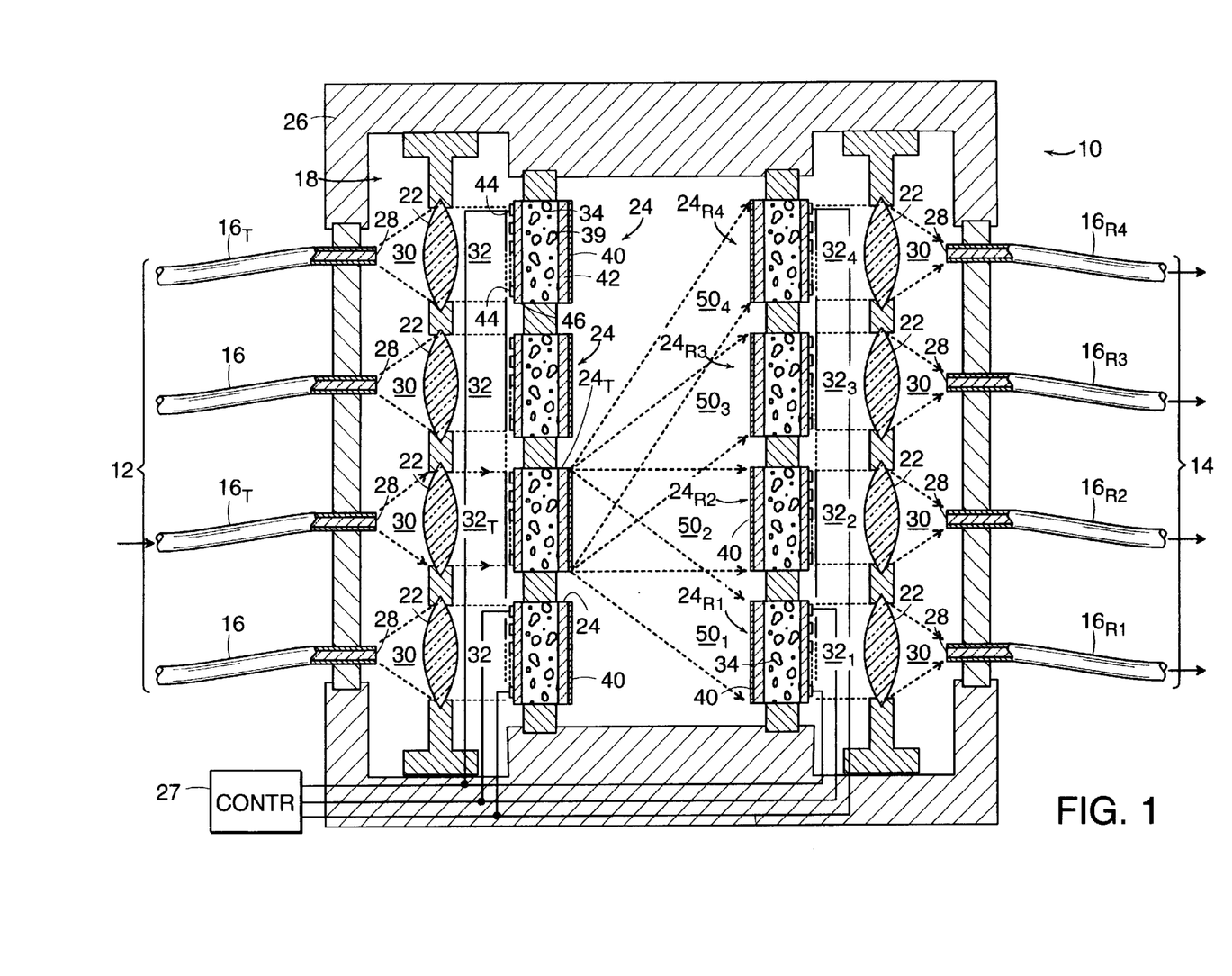
FIG. 1 is schematic diagram of a data communication system according to the invention.

Referring now to FIG. 1, a data communication system 10 is shown. Such system 10 includes two sets 12, 14 of fiber optic cables 16 and a fiber optic switching network 18. The switching network 18 includes: a plurality of collimating lenses 22; a plurality of beam steerers 24; a support structure 26 for securing light emitting/light receiving ends 28 of the plurality of fiber optic cables 16 in predetermined positions, for securing each one of the plurality of collimating lenses 22 in a predetermined position relative to a corresponding one of the fiber optic cables 16, and for securing each one of the beam steerers 24 in a predetermined position relative to a corresponding one of the fiber optic cables 16, as shown; and, a controller 27 for providing electrical control signals to the beam steerers 24. Thus, the supporting structure 26 positions the light emitting/light receiving end 28 of the fiber optic cable 16 along the optic axis of a corresponding collimating lens 22 and the optic axis of such lens 22 normal, and centrally disposed, to the beam intercepting surface of a corresponding beam steerer 24, as shown.

In operation, the divergent beam 30 of modulated light emitted at the terminal, or light emitting/light receiving, end 28 of a fiber optic cable 16 is collimated and directed as a collimated beam 32 of modulated light along the optic axis of the corresponding lens 22. The corresponding beam steerer 24 intercepts the collimated beam 32 and directs the intercepted collimated beam 32 to one, or more of the other fiber optic cables 16 selectively in accordance with the electrical control signals supplied to the beam steerers 24 by controller 27. Therefore, modulated light transmitted by any one, or more than one, of the cables 16 in set 12 can be directed to any one, or more than one, of the fiber optic cables 16 in set 14 by electrical control signals fed to the beam steerers 24 by controller 27. Likewise, by principles of reciprocity, modulated light transmitted by any one of the cables 16 in set 14 can be directed to any one, or more than one, of the fiber optic cables 16 in set 12 by electrical control signals fed to the beam steerers 24 by controller 27. That is, the light emitted from the light emitting/light receiving end 28 of one of the fiber optic cables 16 in set 12, say cable $16_T$, for example, is directed to the light emitting/light receiving end, or ends, 28 of one, or more than one, of the plurality of fiber optic cables 16 in set 14, say cable $16_{R1}, 16_{R3}, 16_{R4}$, for example, selectively in accordance with an electrical control signal fed to the switching system 18, (i.e., the beam steerers $24_T, 24_{R1}, 24_{R3}, 24_{R4}$, corresponding to fiber optic cables $16_T, 16_{R1}, 16_{R3}, 16_{R4}$ respectively, as shown) by controller 27. In this way, information transmitted via one of the cables 16 in set 12 may be sent simultaneously to one, or more than, receiver, not shown, coupled to the plurality of cables 16 in set 14.

Thus, if the number of cables 16 in set 14 is N, then each one of the beam steerers 32 is adapted to produce up to $(2^N)-1$ beam patterns. Thus, here N=4 and thus beam steerer $24_T$, for example, is adapted to produce 15 different beam patterns.

By principles of reciprocity, the light emitted from the light emitting/light receiving end, or ends, 28 of one, or more than one, of the fiber optic cable $16_R$ in set 14 is directed to the light emitting/light receiving end 28 to the light emitting/light receiving end 28 of fiber optic cable $16_T$ in set 12. Thus, in the general case, information can be transmitted and received between fiber optic cables 16 in set 12 and fiber optic cables 16 in set 14.

Each one of the beam steerers 24 includes electro-optical phase shifting medium, preferably liquid crystal molecules. Here, such beam steerer 24 includes a plurality of liquid crystal devices 34, arranged as shown in fixed relationship to the collimating lenses 22 by support structure 26. Here, each one of the liquid crystal devices 34 is of the type described in the following U.S. Patents: U.S. Pat. No. 5,093,747, "Method For Providing Beam Steering in a Subaperture-Addressed Optical Beam Steerer", issued Mar. 3, 1993, inventor Terry A. Dorschner; U.S. Pat. No. 4,964,701, "Deflector for an Optical Beam" inventors Terry A. Dorschner et al; and, U.S. Pat. No. 5,018,835, "Deflector for an Optical Beam Using Refractive Means", issued May 23, 1991, inventor Terry A. Dorschner, all assigned to the same assignee as the present invention, such patents being incorporated herein by reference. As described in the aforementioned U.S. Pat. No. 5,018,835, a liquid crystal device 34 having a common electrode 40 on a first window 42 and a multiplicity of parallel stripe electrodes 44 on a second window 46 provides an optical beam phase shifter, here beam steerer 24. A multiplicity of electrical control signals, here supplied by controller 27, is applied between individual stripe electrodes 44. A reference potential, not shown is applied to the common electrode 40. The voltages applied to the stripe electrodes 44 thereby create local variations of the liquid crystal material 39, here E-7 sold by British Drug House, or PTTP-33 which variations cause differential phase shifts across the cross section of the collimated light beam 32 incident thereon. The molecules of the liquid crystal material 39 are long, thin, rod-like organic molecules of the so-called "nematic" phase. As described in the aforementioned U.S. Pat. No. 5,093,747, when voltages are applied to the stripe electrodes 44 the index of refraction of the liquid crystal material 39 will depend on the level of the voltage applied. The phase shift of the exiting collimated beam 50, relative to that of the incident collimated beam 32, will vary spatially to thereby define the direction of the exiting beam 50. The direction, or directions of the beam, or beams, is a function of the spatial distribution of the indices of refraction provided to the incoming beam, as described in "High-Efficiency In-Line Multiple Imaging By Means of Multiple Phase Holograms" by H. Dammann and K. Gortler, Optics Communications, July 1973, Volume 3, Number 31, pages 312–315, and "Design of binary-phase and multiphase Fourier gratings for array generation" by Joseph N. Mait, Journal of the Optical Society of America (J. Opt. Am. A.) Volume 7, Number 7, August 1990, pages 1514–1528. The spatial distribution of the indices of fraction provided to the incoming beam are established with electrode voltages to direct the exiting beam 50 in the desired angular direction. The beam 32 incident on the liquid crystal device 34, (i.e., beam steerer $24_T$, for example) is steered in a vertical direction and exits as beams in accordance with the following Table:

| Beam(s) | Beam Directed by Beam Steerer $24_T$ to Beam Steerer(s) |
| --- | --- |
| $50_4$ | $24_{R4}$ |
| $50_3$ | $24_{R3}$ |
| $50_2$ | $24_{R2}$ |
| $50_1$ | $24_{R1}$ |
| $50_4$ and $50_3$ | $24_{R4}$ and $24_{R3}$ |
| $50_4$ and $50_2$ | $24_{R4}$ and $24_{R2}$ |
| $50_4$ and $50_1$ | $24_{R4}$ and $24_{R1}$ |
| $50_3$ and $50_2$ | $24_{R3}$ and $24_{R2}$ |
| $50_3$ and $50_1$ | $24_{R3}$ and $24_{R1}$ |
| $50_2$ and $50_1$ | $24_{R2}$ and $24_{R1}$ |
| $50_4, 50_3,$ and $50_2$ | $24_{R4}, 24_{R3},$ and $24_{R2}$ |
| $50_4, 50_2,$ and $50_1$ | $24_{R4}, 24_{R2},$ and $24_{R1}$ |
| $50_4, 50_3,$ and $50_1$ | $24_{R4}, 24_{R3},$ and $24_{R1}$ |
| $50_4, 50_3, 50_2,$ and $50_1$ | $24_{R4}, 24_{R3}, 24_{R2},$ and $24_{R1}$ |

It follows then that for each one of the beam steerers 32, there is a set of 15 electrical control signals. Each one of the electrical control signals in the set is distributed across the electrodes of the beam steerer to produce one of 15 beam patterns described in the Table above. The sets of 15 electrical control signals for each of the, here 8 beam steerers 32, are stored as look-up tables in the controller 27. (It should be understood that if the control signal across the beam steerer 24 produces uniform voltages to the stripe electrodes 44 of the beam steerer 24, the beam incident thereon passes through the beam steerer 24 without any angular deflection).

Figure 2:
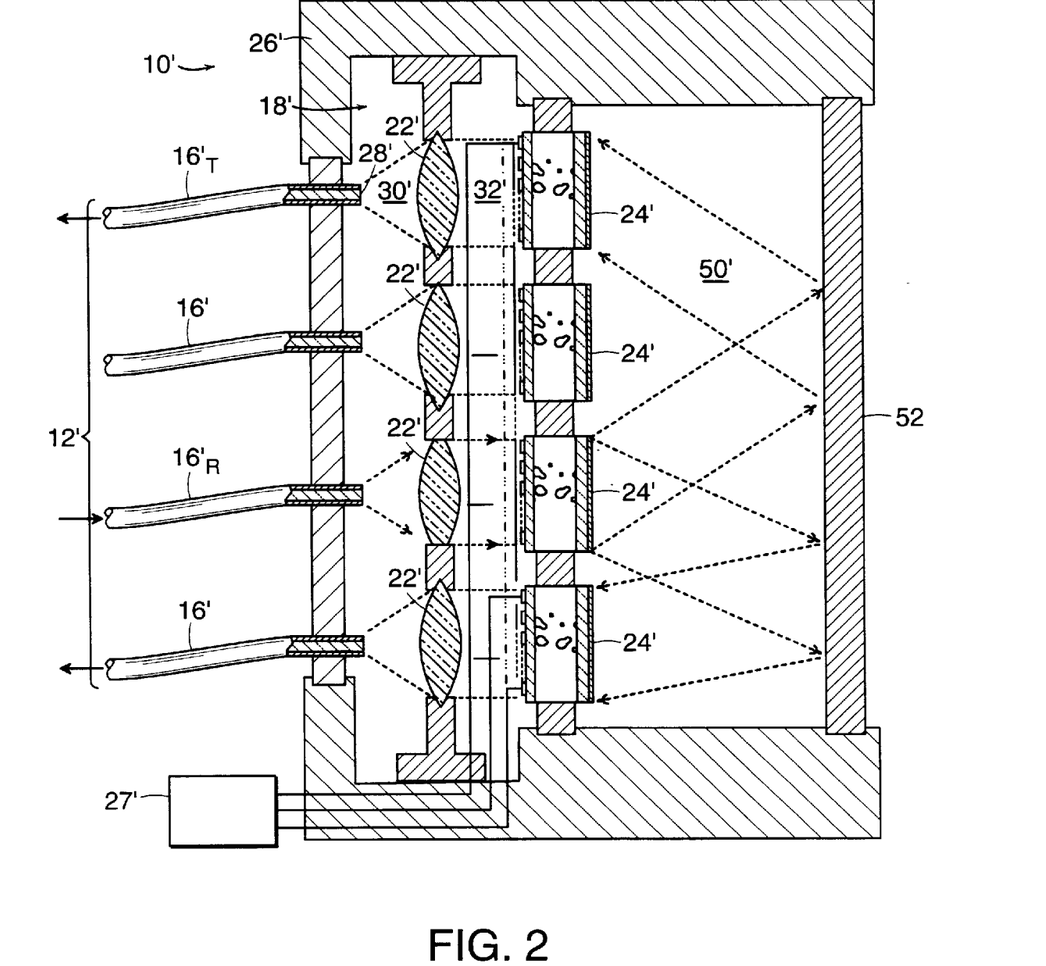
FIG. 2 is a schematic diagram of a data communication system according to an alternative of the invention.

Referring now to FIG. 2, a data communication system 10' is shown. Here, equivalent elements of the communication system 10 are designated in FIG. 2 by a prime (') notation. Here, system 10' includes only one set 12' of a plurality of fiber optic cables 16'. The switching network 18' includes a support structure 26', for securing light emitting/light receiving ends 28' of the plurality of fiber optic cables 16' in predetermined positions, as shown. Each one of a plurality of collimating lenses 22' is also secured in a predetermined position relative to a corresponding one of the fiber optic cables 16' by support structure 26'. More specifically, the divergent beam 30', of modulated light emitted at the terminal, or light transmitting/light receiving end 28' of a fiber optic cable 16' is collimated and directed as a collimated beam 32' of modulated light along the optic axis of the lens 22'. A beam steerer 24' is provided to direct the collimated beam 32' produced from light emitted by one of the fiber optic cables 16' to another one of the fiber optic cables 16' in the set 12'. That is, the light emitted from the light emitting/light receiving end 28' of one of the fiber optic cables 16' in set 12', say cable $16'_T$ is angularly deflected, in accordance with an electrical signal fed to switching network 18' by controller 27', to the reflective surface of a mirror 52. The exiting beam 50' is, after reflection by the mirror 52, passed to the light emitting/light receiving end 28' of another one of the plurality of fiber optic cables 16' in set 12', say $16'_R$, as shown. Again, principles of reciprocity apply. Thus, data can be coupled between one of the cables 16 and another one of the cables 16 selectively in accordance with the electrical control signals provided to beam steerers 24' by controller 27'.

Figure 3:
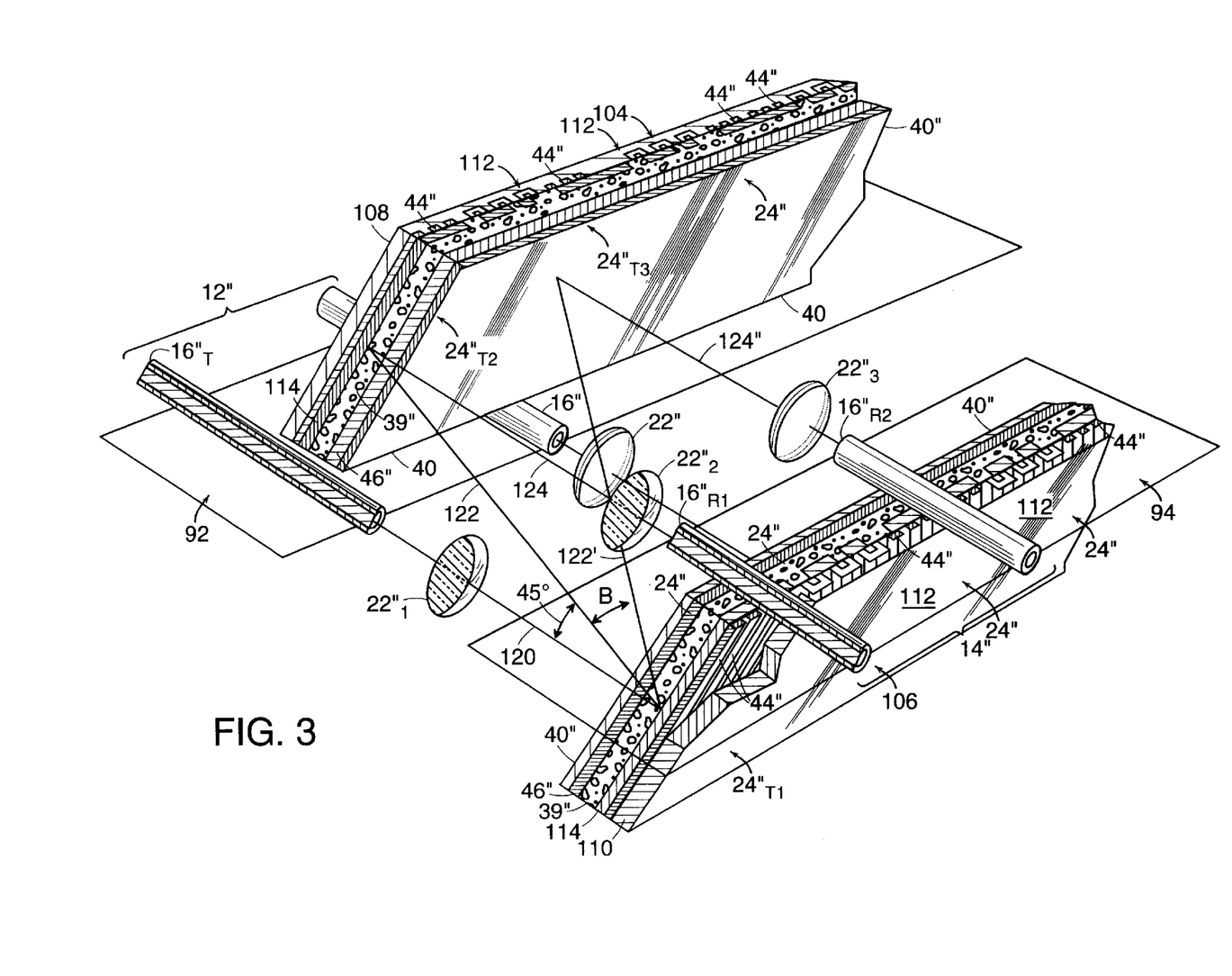
FIG. 3 is a schematic diagram of a data communication system according to an another alternative embodiment of the invention.
Figure 4:
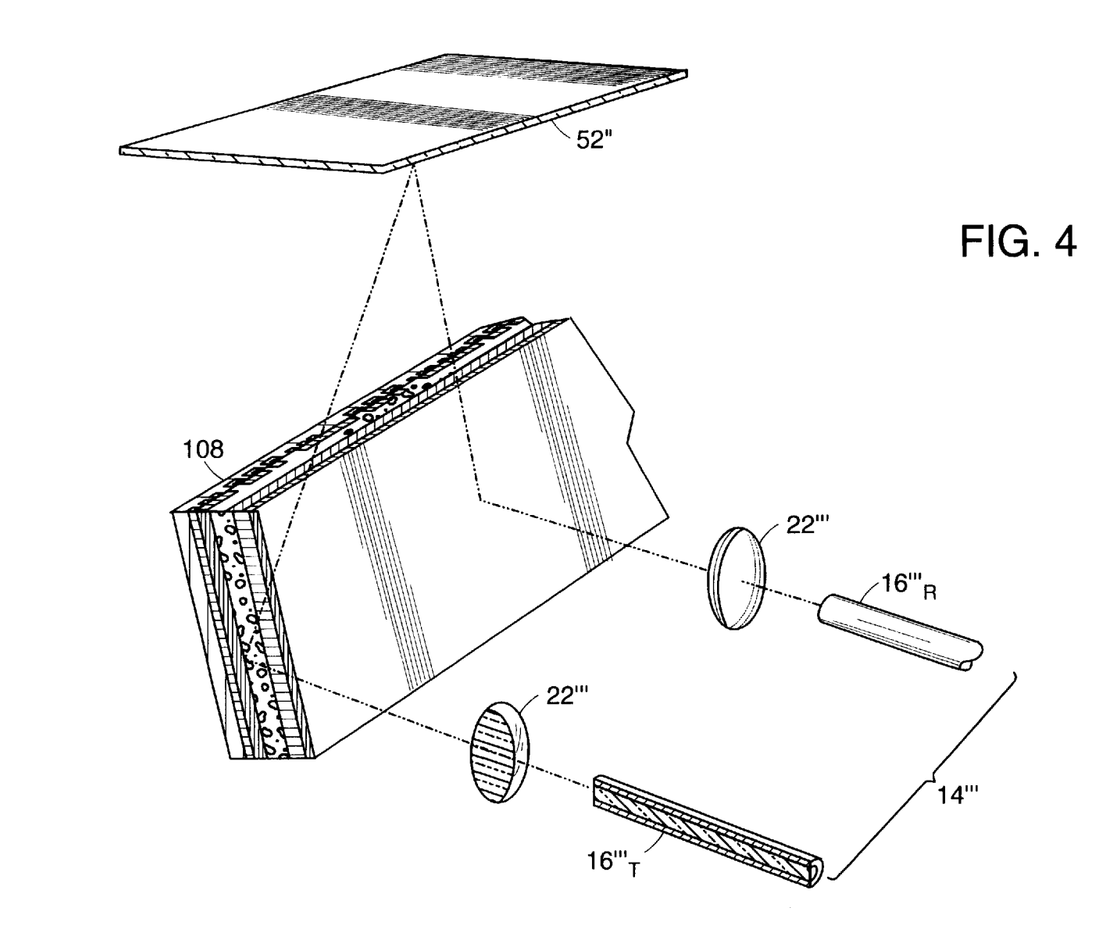
FIG. 4 is a schematic diagram of a data communication system according to an another alternative embodiment of the invention.

As described in U.S. Pat. No. 5,018,835, the beam steerer 24 may be transmissive to incident light, as shown in FIG. 1, or it may be reflective to incident light as shown in FIGS. 3 and 4. Thus, referring to FIG. 3, it is first noted that the support structure is not shown, for simplicity. It is next noted that a double prime (") designation is used to indicate elements equivalent to those used in connection with FIGS. 1 and 2. Thus, a first plurality of laterally displaced fiber optic cables 16" in set 12" is disposed in a first horizontal plane 92, and a second set 14" of fiber optic cables 16" in set 14" is disposed in a second horizontal plane 94; the second plane 94 being parallel to, and vertically positioned above, the first plane 92, as shown. Further, a first set 104 and second set 106 of beam steerers 24" are formed as reflective liquid crystal devices. Here, the beam steerers 24" in the first set 104 and second set 106 are identical in construction and are formed on a separate semiconductor substrate 108, 110, here silicon or gallium arsenide, respectively, as shown. Thus, the substrates 108, 110 each have a plurality of sets of conductor stripe electrodes 44" formed thereon. Each set 24" of stripe electrodes 44" corresponds to one of the beam steerers 24 of FIG. 1. Between each set of stripe electrodes 44", is a region 112. Region 112 has formed therein integrated circuits for supplying control signals to the adjacent set of stripe electrodes 44" of the adjacent one of the beam steerers 24". Disposed on the substrates 108, 110 over each set of stripe electrodes 44" is a reflective surface 114. Between the substrates 108, 110 and transparent opposing window 46" is the liquid crystal material 39". Disposed over the window 46" are transparent common conductors 40".

Thus, considering for example, cable $16"_T$, diverging light emitted therefrom passes through the corresponding collimating lens $22_1$ along axis 120. The light collimated by lens $22_1$ is intercepted by reflecting surface 114 of the beam steerers $24"_{T1}$. The planar reflecting surface 114 of the beam steerers 24" on substrate 110 is tilted upwardly 112.5 degrees with respect to the horizontal plane 92 towards the planar reflecting surface 114 of the beam steerers 24" on substrate 108. (Thus, the perpendicular, or normal, to the plane of the reflecting surface 114 is at a 22.5 degree angle with respect to axis 120). The planar reflecting surface 114 of the beam steerers 24" on substrate 108 is tilted downward 112.5 degrees with respect to the horizontal plane 94 towards the planar reflecting surface 114 of the beam steerers 24" on substrate 110. Thus, the planar surfaces 114 of the beam steerers 24" on substrate 108 is parallel to the planar reflecting surface 114 of the beam steerers 24" on substrate 110.

Here, consider first the condition when the control signal fed to the beam steerers 24" produces a uniform voltage distribution across the vertical stripe electrodes 44" of the beam steerers 24" (i.e., the case where the beam steerer 24" does not provide any horizontal, or lateral, angular beam deflection). Thus, because of the angular tilt of the planar reflecting surface 114 of beam steerer $24"_{T1}$ on substrate 108, relative to the plane 92, the intercepted beam is re-directed upward along axis 122, such axis 122 being at an angle 45 degree angle with respect to the axis 120, toward beam steerer $24"_{T2}$. The beam is next intercepted by reflecting surface 114 of beam steerer $24"_{T2}$ formed on substrate 108. Because of the angular tilt of the planar reflective surface 114 of such beam steerer $24"_{T2}$, the intercepted beam is directed along axis 124 through lens $22"_2$ to fiber optic cable $16"_{R1}$, where axis 124 is parallel to, and disposed vertically above, axis 120. On the other hand, with a control signal fed to beam steerer $24"_{T1}$ which causes an horizontal, or lateral, angular deflection to the beam incident thereon (i.e., the beam passing along axis 120), is deflected laterally at angle B relative to axis 120. Thus, in addition to its inherent (i.e., geometrically produced) vertical 45 degree vertical deflection, such beam is deflected to one of the laterally disposed beam steerers 24" in the second set thereof, say, for example along axis 122' to laterally displaced beam steerer $24"_{T3}$. In such case the light intercepted by the reflective surface 114 of beam steerer $24"_{T3}$ is directed along axis 124" through lens $22"_3$, to fiber optic cable $16"_{R2}$ (axis 124" is parallel to but laterally displaced from axis 124). Again, principles of reciprocity apply so that information may be transmitted and received between the fiber optic cables 16" in set 12" and the fiber optic cables 16" in set 14" is shown.

Referring to FIG. 4, an arrangement using the reflective beam steerers 24'" of FIG. 3, but with only one set of fiber optic cables 16'", here set 14'", similar to the arrangement discussed above in connection with FIG. 2, as shown. Here, the reflecting surface of the beam steerers on substrate 108 is at a 45 degree angle with respect to the horizontal plane, as in FIG. 2, but the mirror 52' is parallel to the horizontal plane.

Having described preferred embodiments of the invention, it will now become readily apparent to one of skill in the art that other embodiments incorporating its concepts may be made. For example, in addition to electronically steering laser beams, liquid crystal phased arrays may be used to steer in multiple directions simultaneously. This capability may be used to provide electronically programmable branching trees for fiber optic communications. Two dimensional arrays of liquid crystal devices 34 with electronic addressing for both beam steering and simultaneous direction steering may be used in optical computing applications. The invention may be used in any system that requires the switching of optical signals. Large two dimensional areas of liquid crystal devices 34 may be useful for optical computing, as mentioned above, especially in image processing applications. It is felt, therefore, that the invention should not be restricted to the described embodiments, but rather should be limited only by the spirit and scope of appended claims.

What is claimed is:

1. A fiber optic switching system, comprising:
    a plurality of fiber optic cables;
    a support structure for securing light emitting/light receiving ends of the plurality of fiber optic cables in predetermined positions; and
    means for selectively steering light emitted from the light emitting/light receiving end of one of the fiber optic cables simultaneously to the light emitting/light receiving ends of more than one of the plurality of fiber optic cables, the selectively steering means comprising means for collimating and directing the light emitted from the end of one of the cables as a beam propagating along a predetermined direction and means for changing the index of refraction of a liquid crystal material for providing a plurality of beam steering positions for steering the beam towards the ends of more than one of said plurality of fiber optic cables selectively in accordance with an electrical signal.

2. The system recited in claim 1 wherein the steering means includes electro-optical phase shifting medium.

3. The system recited in claim 2 wherein the phase shifting medium comprises liquid crystal molecules.

4. A switching system, for coupling information propagating as electromagnetic wave energy between selected ones of a plurality of terminals having a predetermined spatial relationship, each one of such terminals being adapted to transmit said wave energy and receive said transmitted wave energy, said system comprising: means, responsive to an electrical signal and positioned to receive the wave energy transmitted from one of the terminals, for changing the index of refraction of said means for providing a plurality of beam steering positions as said received wave energy passes through said means and for selectively steering simultaneously said received energy to a plurality of the spaced terminals selectively in accordance with the electrical signal.

5. The system recited in claim 4 wherein the selectively steering means includes means for collimating and directing the light emitted from the end of one of the terminals as a beam propagating along a predetermined direction and for steering the beam towards the ends of the terminals selectively in accordance with an electrical signal.

6. The system recited in claim 5 wherein the steering means comprises electro-optical phase shifting medium.

7. The system recited in claim 6 wherein the phase shifting medium comprises liquid crystal molecules.

8. A system for coupling information propagating in a beam of electromagnetic wave energy between selected ones of a plurality of cables having a predetermined spatial relationship, each one of such cables being adapted to transmit said wave energy and receive said transmitted wave energy, said system comprising: means, responsive to an electrical signal and positioned to intercept the beam of wave energy emanating from one of the cables, for changing the index of refraction of a liquid crystal material for providing a plurality of beam steering positions for simultaneously steering said intercepted beam to a plurality of the spaced cables selectively in accordance with the electrical signal.

9. The system recited in claim 8 wherein the steering means includes means for collimating and directing the light emitted from the end of one of the cables as a beam propagating along a predetermined direction and for selectively steering the beam towards the end of another one of the cables selectively in accordance with an electrical signal.

10. The system recited in claim 9 wherein the selectively steering means includes electro-optical phase shifting medium.

11. The system recited in claim 10 wherein the phase shifting medium comprises liquid crystal molecules.

12. A method for coupling information propagating as electromagnetic wave energy between selected ones of a plurality of terminals having a predetermined spatial relationship, each one of such terminals being adapted to transmit said wave energy and receive said transmitted wave energy, said method comprising: changing the index of refraction of a liquid crystal material for providing a plurality of beam steering positions to simultaneously steer energy to a plurality of the spaced terminals selectively in accordance with the electrical signal.

13. The method recited in claim 12 wherein the index of refraction changing step includes the step of collimating and directing the light emitted from the end of one of the terminals as a beam propagating along a predetermined direction and for steering the beam towards the end of another one of the terminals selectively in accordance with an electrical signal.

14. The method recited in claim 13 wherein the steering step includes the step of changing the phase shift provided to the beam by an electro-optical phase shifting medium.

15. The method recited in claim 14 wherein the phase shift changing step includes the step of changing the orientation of liquid crystal molecules in the phase shifting medium.

16. A method for coupling information propagating in a beam of electromagnetic wave energy between selected ones of a plurality of cables having a predetermined spatial relationship, each one of such cables being adapted to transmit said wave energy and receive said transmitted wave energy, said method comprising the steps of: intercepting the beam of wave energy emanating from one of the cables and changing the index of refraction of a liquid crystal material for providing a plurality of beam steering positions for simultaneously steering said intercepted beam to a plurality of the spaced cables selectively in accordance with an electrical signal.

17. The system recited in claim 16 wherein the steering step comprises the step of: collimating and directing the light emitted from the end of one of the cables as a beam propagating along a predetermined direction and for selectively steering the beam towards the ends of the plurality of the plurality of fiber optic cables selectively in accordance with an electrical signal.

18. The system recited in claim 17 wherein the selectively steering step includes the step of changing the phase shift provided to the beam by an electro-optical phase shifting medium.

19. The method recited in claim 18 wherein the phase shift changing step includes the step of changing the orientation of liquid crystal molecules in the phase shifting medium.

* * * * *

UNITED STATES PATENT AND TRADEMARK OFFICE
CERTIFICATE OF CORRECTION

PATENT NO. : 5,963,682  
DATED : 10/5/99  
INVENTOR(S) : Dorschner et al.

Page 1 of 2

It is certified that error appears in the above-identified patent and that said Letters Patent is hereby corrected as shown below:

Column 7, line 4, after "includes" insert --an--

Column 7, line 19, delete --selectively--

Column 7, line 21-22, delete --selectively steering--

Column 7, line 22, after "means" insert --for changing the index of refraction--

Column 7, line 27, delete "steering"

Column 7, line 28, after "means" insert --for changing the index of refraction--

Column 7, line 28, after "comprises" insert --an--

Column 7, line 44, delete "steering"

Column 7, line 45, after "means" insert --for changing the index of refraction--

Column 7, line 50-51, delete "selectively steering"

Column 7, line 51, after "means" insert --for changing the index of refraction--

Column 7, line 51, after "includes" insert --an--

UNITED STATES PATENT AND TRADEMARK OFFICE
CERTIFICATE OF CORRECTION

PATENT NO. : 5,963,682

DATED : 10/5/99

INVENTOR(S) : Dorschner et al.

It is certified that error appears in the above-identified patent and that said Letters Patent is hereby corrected as shown below:

Column 8, line 42, delete "selectively"

Signed and Sealed this

Seventeenth Day of October, 2000

*Attest:*

Q. TODD DICKINSON

*Attesting Officer*     *Director of Patents and Trademarks*